UNITED STATES PATENT OFFICE.

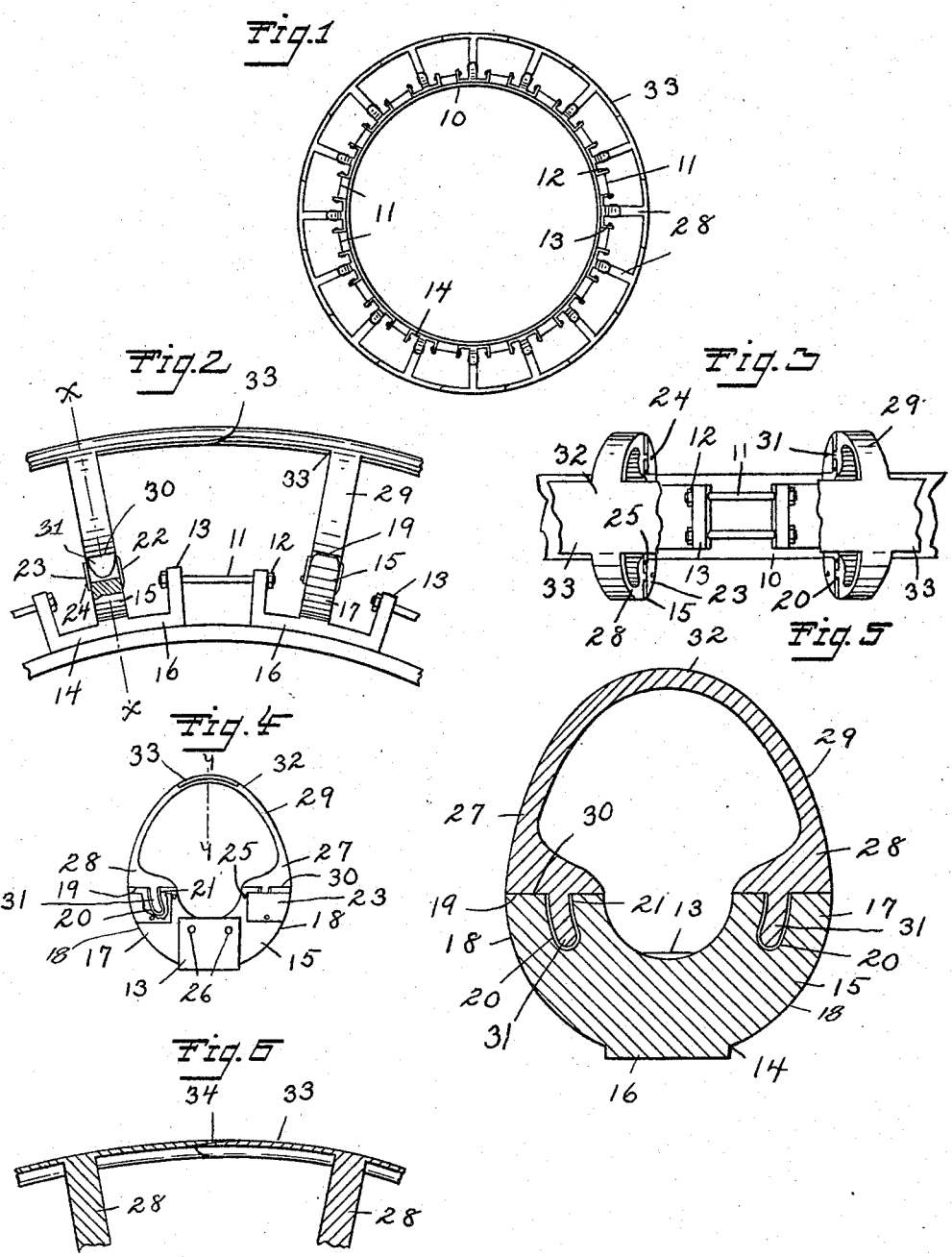

PATRICK M. RINGROSE, OF NEW BRITAIN, CONNECTICUT.

AUTOMOBILE-TIRE DEVICE.

1,187,390.   Specification of Letters Patent.   Patented June 13, 1916.

Application filed August 10, 1915. Serial No. 44,798.

*To all whom it may concern:*

Be it known that I, PATRICK M. RINGROSE, a citizen of the United States, residing at New Britain, in the county of Hartford and State of Connecticut, have invented certain new and useful Improvements in Automobile-Tire Devices, of which the following is a specification.

My invention relates to improvements in automobile tire devices, and the object of my improvement is simplicity and economy in construction and convenience and efficiency in use.

In the accompanying drawing: Figure 1 is a side elevation of my improved automobile tire device. Fig. 2 is a similar view on an enlarged scale of a portion of the same. Fig. 3 is a plan view of the same. Fig. 4 is an end elevation in part broken out of one of the sectional units. Fig. 5 is a sectional view on the line $x\ x$ of Fig. 2. Fig. 6 is a sectional view on the line $y\ y$ of Fig. 4.

My improved automobile tire device comprises a plurality of sectional units positioned around a circular rim 10 and held in position by connecting bolts 11 and nuts 12 that serve to connect adjacent end flanges 13. The rim 10 fits over the periphery of the wheel structure. The said units comprise a base member 14 having a body portion 16 that extends over an appreciable length, whose inner surface fits over the rim 10 and is mounted thereon, and which at the ends is provided with the outwardly extending radial flanges 13 already mentioned, for receiving the connecting bolts 11.

At the middle portion the base member 14 is provided with a standard 15 that extends outwardly relatively to the body portion 16. The body portion 16 of the base member 14 fits over and is supported by the rim 10, and is of sufficient width to provide a proper support. The standard 15 widens out laterally as it extends outwardly from the said body portion 16 and terminates in the form of a pair of arms 17, the ends 19 of which are rounded. The periphery 18 of the arms 17 is rounded as shown. The outer ends of the arms 17 are finished off in the form of a rounded platform 19, as shown in Fig. 2, of appreciable width laterally. Each arm 17 is provided with a recess 20 that extends inwardly from the outer end 19, in the form of an arc, as shown, so as to provide an overhanging corner 21 on the inner side.

The recesses 20 are closed at the ends, one of which closures at least is made removable. As shown in Fig. 2 the right hand closure 22 is made fixed and the left hand closure 23 is made movable, being in the form of a door swinging in a radial plane, pivotally mounted on the pin 24. A stop pin 25, shown in Fig. 4, limits the movement of the door 23 in the closed position.

As shown, there are two holes 26 in the flanges 13 for a corresponding number of bolts 11.

A tread member 27 is mounted on each standard 15, being generally U-shape, with the arms 28 inwardly extended to meet the arms 17, and having the periphery 29 rounded in continuation of the rounded periphery 18 of the arms 17. The base portion 30 of the arms 28 is flat or plane as shown in Fig. 2, and extends in each case over the rounded platform 19, and on the inner side is provided with a horn-like projection or finger 31 that is a loose fit in the curved recess 20, and positioned therein. The curved recess 20 and the finger 31 are of sufficient length and curvature so that the inner portion of the finger 31 will be overhung by the overhanging corner 21 and thereby radial separation of these parts is prevented. The ends of the fingers 31 are tapered to allow circumferential play of the tread member 27 relatively to the base member 14.

The fingers 31 and recesses 20 are brought into engagement by a relative endwise or circumferential movement, with the movable closure or door 23 in the open position, the said door being afterward closed.

The tread member 27 is made of metal and the peripheral or tread portion 32 is made sufficiently thin to provide the desired resiliency, and the gap between the adjacent arms 28 at the tread portion is bridged by means of circumferentially extending wings 33 of shell-like form, and having the opposed ends 34 of tapered form and having overlapping engagement. Accordingly there are two wings 33 extending circumferentially from each of the tread members 27, at the apex portion 32 and these have their ends in overlapping engagement with the wings 33 of the adjacent tread members 27.

The base portion 30 of the tread members 27 have rocking engagement with the rounded platform 19 on which they are mounted, and a limited swinging or rocking movement is permitted to the said tread members 27 by reason of the loose fit of the fingers 31 in the recesses 20.

As described, my tire structure is built up of parts that provide a resilient tread portion, and which permits of a limited general circumferential movement of the periphery, which in use prevents shock and permits of some flexibility of movement of the parts that engage with the roadway.

I claim as my invention:

1. A tire structure comprising a plurality of units interconnected to inclose a rim, the said units comprising base members on the inner sides, and a separate tread member mounted on each of the said base members, the said base members having radial flanges at the ends, means connecting the flanges of adjacent members, and means for supporting and holding the said tread member in each case on the base member on which it is mounted, independent of the adjacent tread members.

2. A tire structure comprising a plurality of units interconnected to inclose a rim, the said units comprising base members on the inner sides, a separate tread member mounted on each of the said base members, the means of engagement of the said members comprising opposed end portions, and one of the said end portions being plane and the other rounded, suitably to permit of a relative rocking movement of the said members.

3. In a tire structure, a sectional unit comprising a base member having a standard, a tread member supported by the said standard, the said standard having a pair of recesses in spaced relation and generally converging, and the said tread member having fingers that are positioned in the said recesses.

4. In a tire device, base members and tread members mounted thereon, the said tread members each comprising a supporting member, and wings extending circumferentially from the ends of the said supporting member and the outer face of the said wings and of the said supporting member being finished off concentric with the axis of the tire device suitably to serve as a tread portion proper of the said tire device.

5. A tire device comprising a rim, and sectional units mounted on the said rim, the said units comprising base members, having radial flanges at the end portions, tread members mounted on the said base members, and bolts connecting the said flanges of adjacent members, there being one such tread member mounted on each base member and supported therefrom independently of the adjacent tread member.

PATRICK M. RINGROSE.

Witnesses:
R. W. EDWARDS,
C. ALBERT JOHNSON.